(12) United States Patent
Harle et al.

(10) Patent No.: US 9,677,969 B2
(45) Date of Patent: Jun. 13, 2017

(54) METHOD FOR DIAGNOSING THE MALFUNCTIONING OF A DEVICE FOR ADDING AN ADDITIVE INTO A FUEL FOR A VEHICLE, AND SYSTEM FOR IMPLEMENTING SAID METHOD

(71) Applicants: RHODIA OPERATIONS, Paris (FR); FILTRAUTO SA, Guyancourt (FR)

(72) Inventors: Virginie Harle, Senlis (FR); Michael Lallemand, Saint Denis (FR); Thierry Seguelong, Bourgneuf (FR); Guy Monsallier, Granville (FR)

(73) Assignees: Rhodia Operations, Paris (FR); Filtrauto SA, Guyancourt (FR)

( * ) Notice: Subject to any disclaimer, the term of this patent is extended or adjusted under 35 U.S.C. 154(b) by 188 days.

(21) Appl. No.: 14/370,703

(22) PCT Filed: Jan. 4, 2013

(86) PCT No.: PCT/EP2013/000012
§ 371 (c)(1),
(2) Date: Jul. 3, 2014

(87) PCT Pub. No.: WO2013/102621
PCT Pub. Date: Jul. 11, 2013

(65) Prior Publication Data
US 2014/0366615 A1   Dec. 18, 2014

(30) Foreign Application Priority Data

Jan. 4, 2012   (FR) ..................... 12 00024

(51) Int. Cl.
*G01M 15/04* (2006.01)
*F02D 41/22* (2006.01)
(Continued)

(52) U.S. Cl.
CPC .......... *G01M 15/042* (2013.01); *F02D 19/12* (2013.01); *F02D 41/0025* (2013.01);
(Continued)

(58) Field of Classification Search
CPC . F02M 25/00; F02D 19/12; F02D 2200/0611; F02D 41/0025; F02D 41/221
(Continued)

(56) References Cited

U.S. PATENT DOCUMENTS 6,068,672 A * 5/2000 Watson .................. B60K 15/00
                                                       123/1 A
6,136,048 A   10/2000 Birchem et al.
(Continued)

FOREIGN PATENT DOCUMENTS

DE   10311287 A1   9/2004
EP    671205 A2    9/1995
(Continued)

*Primary Examiner* — Freddie Kirkland, III (57) ABSTRACT

The invention relates to a method for diagnosing the malfunctioning of a device for adding an additive into a fuel for a vehicle comprising an internal combustion engine, said method including: a step of analyzing the fuel in order to determine a variation in the amount of additive in the fuel; a step of comparing the variation in the amount of additive, measured during the previous step, with a theoretical variation in said amount; a step of sending information when the difference between the measured variation and the theoretical variation exceeds a set value. The invention also relates to a system for adding an additive into fuel and for diagnosis for a vehicle comprising an internal combustion engine, which is intended for implementing said method.

21 Claims, 6 Drawing Sheets

(51) Int. Cl.
  *F02M 25/00* (2006.01)
  *F02D 19/12* (2006.01)
  *F02D 41/00* (2006.01)
(52) U.S. Cl.
  CPC ........... *F02D 41/221* (2013.01); *F02M 25/00* (2013.01); *F02D 2200/0611* (2013.01); *Y02T 10/40* (2013.01)
(58) Field of Classification Search
  USPC ...................................................... 73/114.77
  See application file for complete search history.

(56) References Cited

U.S. PATENT DOCUMENTS

| | | | | |
|---|---|---|---|---|
| 6,321,692 | B1* | 11/2001 | Rayner | F02M 25/00 123/1 A |
| 7,428,890 | B2* | 9/2008 | Lay | F02M 37/0047 123/1 A |
| 7,469,661 | B2* | 12/2008 | Kunstmann | B60K 15/00 123/1 A |
| 8,744,723 | B2* | 6/2014 | Jones | F02D 41/0025 701/103 |
| 9,267,465 | B2* | 2/2016 | Monsallier | C10L 1/02 |
| 2002/0007804 | A1* | 1/2002 | Tichenor | F02M 25/00 123/1 A |
| 2003/0136355 | A1* | 7/2003 | Gouzou | B60K 15/00 123/1 A |
| 2005/0039382 | A1 | 2/2005 | Blanchard et al. | |
| 2006/0005465 | A1 | 1/2006 | Blanchard et al. | |
| 2006/0254535 | A1* | 11/2006 | Valentine | F02D 33/006 123/1 A |
| 2008/0162016 | A1 | 7/2008 | Lunati et al. | |
| 2010/0252737 | A1 | 10/2010 | Fournel et al. | |
| 2010/0299022 | A1* | 11/2010 | Jones | F02D 41/0025 701/33.4 |
| 2013/0306028 | A1 | 11/2013 | Monsallier et al. | |
| 2014/0238349 | A1* | 8/2014 | Harle | F02M 37/0082 123/444 |

FOREIGN PATENT DOCUMENTS

| | | |
|---|---|---|
| EP | 1229227 A2 | 8/2002 |
| GB | 2254610 A1 | 10/1992 |
| WO | 9719022 A1 | 5/1997 |
| WO | 0110545 A1 | 2/2001 |
| WO | 03053560 A1 | 7/2003 |
| WO | 2005071316 A1 | 8/2005 |
| WO | 2006100377 A1 | 9/2006 |
| WO | 2008116550 A1 | 10/2008 |
| WO | 2009047605 A1 | 4/2009 |
| WO | 2009047607 A2 | 4/2009 |
| WO | 2009047608 A1 | 4/2009 |
| WO | 2010150040 A1 | 12/2010 |
| WO | 2012104552 A1 | 8/2012 |

* cited by examiner

METHOD FOR DIAGNOSING THE MALFUNCTIONING OF A DEVICE FOR ADDING AN ADDITIVE INTO A FUEL FOR A VEHICLE, AND SYSTEM FOR IMPLEMENTING SAID METHOD

CROSS-REFERENCE TO RELATED APPLICATIONS

This application is a U.S. national stage entry under 35 U.S.C. §371 of International Application No. PCT/EP2013/000012 filed Jan. 4, 2013, which claims priority to French Application No. 12/00024, filed Jan. 4, 2012. The entire contents of these applications are explicitly incorporated herein by this reference.

The invention relates to a method for diagnosing the malfunctioning of a device for additivation of an additive to a fuel for a vehicle having an internal combustion engine and also to a system for the implementation of this method.

New engine technologies, such as diesel engines having a common rail system and having very high pressure injection of fuel or also direct injection gasoline engines are very effective but, however, very sensitive to the quality of the fuel.

Thus, there is a benefit in using a fuel comprising additives which improve its quality, in particular additives for improving the distribution of the fuel in the engine, additives for improving the performance of the operation of the engine and additives for improving the stability of the operation of the engine. They are, for example, detergent agents, lubricating additives or also corrosion inhibitors.

However, the quality of available commercial fuels does not always make it possible to supply the engine with a fuel comprising sufficient additives. Furthermore, fuels meet, across the world, more or less exacting standards and thus have a variable quality. There is thus advantage, for optimum operation of the engine, in adjusting the concentration of additive present in the fuel.

Moreover, in order to meet the new emission control standards for vehicles, in particular diesel vehicles, vehicles are gradually being fitted with pollution-control means of particle filter (PF) type. Such is already the case in Europe since the Euro 5 standard came into force. In most instances, a catalyst is used to assist in periodically incinerating the soot and thus regenerating the PF. The use of an additive for regenerating the PF borne by the fuel supplying the engine, or also Fuel Borne Catalyst (FBC), has proved to meet many criteria since it makes it possible to regenerate the PF more rapidly and at lower temperature than the competing technology, known as Catalysed Soot Filter (CSF).

There is thus advantage in equipping the vehicle with a device which makes it possible to introduce, into the fuel, an additive for helping in the regeneration of the PF and/or fuel additives which improve the quality of the fuel and/or the operation of the engine and/or its durability.

It is known that there exist systems which make it possible to introduce such additives into the fuel, in particular the FBC catalytic additives for helping in the regeneration of the particle filters. These systems are generally based on a large-sized tank, with a minimum volume of 1 to 3 liters, containing the additive supply and which needs to be installed in areas close to the fuel tank.

The metering of the additive is then generally carried out using high-precision metering pumps controlled by an additional electronic central processing unit (ECU). This metering device is managed very accurately in order to ensure that the additive content in the fuel is high enough to allow good regeneration of the PF but not so high as to cause premature fouling of the PF due to the inorganic residues from PF regeneration which remain trapped within it.

Conventionally, when the level of fuel increases in the tank following the addition of fuel, a computer informs the pump of how much additive to inject into the tank in order to keep the additive concentration in the fuel constant at all times.

The grouping of these devices (pump/tank) does not have available any means for detecting in a simple way a malfunctioning of the device. The term "malfunctioning" can be understood as meaning the fact that the device does not deliver additive, contrary to the desired value required of it, for example subsequent to the addition of fuel when the additivation is under the control of this parameter. The term "malfunctioning" can also be understood as meaning the fact that the amount additivated is significantly different from the theoretical amount to be injected. The term "malfunctioning" can also be understood as meaning the fact that the amount additivated can, over the course of time, deviate (by excess or by deficiency) from the theoretical amount.

The malfunctionings can have multiple origins, such as a fault in production equipment (pump, ECU, and the like) or also a poor connection or branching of the assembly of the device. In these cases, the malfunctioning appears from the first requests for additivation. It can also be a drift over time, for example subsequent to the fouling or blocking of a pipeline, to a change in the additive or to the wear of a part. In this case, the difference in the amount injected with respect to the theoretical amount generally changes over time, suddenly or gradually. There exist many other possible causes which can be the source of the malfunctioning of the device.

In the event of malfunctioning, the devices currently in place generally do not directly identify the failure of the additivation system. The ECU of the vehicle will, for example, in the case of an FBC, detect a failure of the pollution-control system, in particular poor regeneration of the PF, without identifying the true cause of the failure, that is to say poor additivation or absence of additivation.

Furthermore, detection may take place after a more or less lengthy period of time after the defective additivation: typically, in the example given for the regeneration of the PF, the malfunctioning will be identified after the regeneration of the PF, thus typically after more than 500 to 700 km, i.e. several hours after the additivation, indeed even only after several requests for regeneration of the PF.

In this example, this additivation fault may have serious consequences, such as the destruction of the PF, and result in major costs in bringing back into conformity.

On the other hand, an excess of FBC additive will not be detected during the regenerations of the PF since the latter will be regenerated without difficulties. The defect will become apparent only after the vehicle has traveled several tens of thousands of kilometers, when the PF will be prematurely obstructed by an excess of ash originating from the FBC.

It is the same in the case of the other fuel additives: in this case, detection is even more problematic as many other parameters may influence the operation of the engine. The consequences, for example with regard to the damage to the high-pressure pumps or to the high-pressure injectors, nevertheless remain very significant and expensive in the case where these components have to be replaced.

There is thus a need to be able to rapidly detect a fault in the additivation system of the vehicle: the term "rapidly" is understood to mean the fact of being able to determine the failure within the hour, indeed even the minutes, following the order to additivate and/or the end of the additivation.

It is thus also advantageous to determine if the malfunctioning corresponds to a non-injection or else to a difference between the amount injected and the amount theoretically injected. This makes it possible to immediately notify the central system for diagnosing failure (On Board Diagnostic or OBD) of the failure, to help in diagnosing the cause of the failure, by identifying that the injection system is involved, to define possible rapid actions to be taken in order to protect the vehicle or certain components, for example by allowing only a reduced mode of use of the vehicle (limitation of the power, for example).

The object of the invention is thus to meet these needs.

More particularly, a first object of the invention is to provide a method and a device for diagnosing a malfunctioning in the additivation of a fuel. A second object of the invention is to provide a device which is simple to operate.

With this aim, the invention relates to a method for diagnosing the malfunctioning of a device for the additivation of at least one additive to a fuel for a vehicle having an internal combustion engine, and this method is characterized in that it comprises the following stages:

(a) a stage of analysis of the fuel in order to measure a variation in the content of additive in the fuel;

(b) a stage of comparison between the variation in the content of additive measured during the preceding stage and a theoretical variation in this content;

(c) a stage of sending data when the difference between the measured variation and the theoretical variation in this content of additive exceeds a fixed value.

The invention also relates to a fuel additivation and diagnosis system for a vehicle having an internal combustion engine, for the implementation of the method described above, and which is characterized in that it comprises:

a device for distributing at least one additive in a fuel circulation circuit of the engine of the vehicle;

a device for analysis of the fuel in order to measure the variation in the content of additive in the fuel;

means for sending data as a function of the results of the analysis of the fuel which are obtained by said analytical device.

Other characteristics, details and advantages of the invention will become even more fully apparent on reading the description which will follow, made with reference to the appended drawings, in which.

The method of the invention comprises a first stage in which the fuel is analyzed for the purpose of measuring the variation in its content of additive.

As will be seen later, the analysis may not be based on a direct measurement of the content of additive in the fuel but on an indirect measurement, that is to say on the measurement of a characteristic or of a parameter of the fuel which is correlated with this content, for example the absorbance of the fuel.

According to a specific embodiment of the invention, the measurement of the variation in the content of additive in the fuel can be carried out by subtracting a value obtained by analysis of the fuel before additivation from a value obtained by analysis of the fuel after additivation.

In a second stage, the results of the measurement carried out in the preceding stage are compared with a theoretical value, so as to demonstrate a possible difference between the measured value and the theoretical value. If such a difference is detected and if this difference is greater than a value fixed beforehand, the method of the invention then comprises a stage of sending data.

This fixed value is that above which it is considered that there is a malfunctioning and it can be determined by a person skilled in the art: it depends in particular on the type of additive used, on the sensitivity of the detection device chosen, on the type of vehicle and/or engine, on the type of engine technology, on the type of fuel used by the vehicle, in particular on the standard in force in the geographical area in which the vehicle is used, on the pollution-control technology, in particular on the type of PF, and the like.

When a difference corresponding to this value is measured, the datum, for example a warning signal, can then be sent to one or more components of the vehicle, in particular:

to the device for injection of the additive, in particular when this can readjust, by itself, the amount injected, to the ECU system of the vehicle, to the central system for diagnosing failure of the vehicle.

The method can be applied at a defined frequency and/or in response to an event. According to a preferred embodiment, this method is applied after each addition of additive, having taken care to carry out an analysis of the fuel before the additivation.

According to another preferred embodiment, this method is applied after each addition of fuel to the vehicle.

The method can also be carried out continuously.

Any analytical technique which makes it possible to detect the presence, the amount of additive and/or the variation in this amount in the fuel will be able to be used. The choice of this technique will depend on the additive and the fuel.

It should be noted that the method of the invention applies in particular to vehicles having engines which use gasoline or diesel as fuel.

Furthermore, the vehicles can be off-road vehicles, such as site equipment, or on-road vehicles, such as motor vehicles.

The method of the invention can be used more particularly in the case where the additive is an additive for regeneration of the particle filters of FBC type.

The system for the implementation of the method of the invention will now be described.

As indicated above, this system comprises a device for distribution of an additive in a fuel circulation circuit of the engine of the vehicle, an analytical device for the fuel, in order to measure the content of additive in the fuel, and means for sending data as a function of the results of the analysis of the fuel which are obtained by said analytical device.

The analytical device can be placed at any point of the circuit in which the fuel, once additivated, circulates, in particular in the fuel tank, in the gauge/pump module, in the fuel filter or filters, in the circuit for supplying the engine and/or the circuit for returning to the tank. This device can in particular be located close to the site of injection of the additive into the fuel.

According to a specific embodiment, the device for analysis of the fuel is a spectroscopy device.

More specifically, it is a device in which the detection and the measurement of an amount of additive in the fuel are based on a spectroscopic method using infrared technology: near infrared (typically from 780 to 1400 nm), mid infrared (typically from 1400 to 3000 nm), indeed even far infrared (typically from 3000 to 1 000 000 nm), visible (typically 780 to 380 nm), near ultraviolet (380-200 nm) or also extreme ultraviolet (200-100 nm). Preferably, use will be made of near infrared (or NIR), visible or near ultraviolet spectroscopy in the wavelength range between 190 and 2500 nm. This is because these types of spectroscopy are well-suited to the analysis of fuels and they can be employed for analytical methods which are highly sensitive to a change in composition of the fuel.

The devices of this type generally comprise:
- a lighting device configured in order to generate a light beam covering the chosen wavelength range;
- a probe configured in order for the light beam resulting from the lighting device to interact with the fuel to be analyzed;
- a spectral analytical device configured in order to receive the light beam after having interacted with the fuel to be analyzed and in order to provide measurements as a function of an amount of light received for different wavelength ranges.

According to a preferred embodiment, the analytical device is designed in order to operate over a specific wavelength, a wavelength selected from the viewpoint of the type of additive and of the type of fuel (in particular gasoline or diesel) and making it possible to develop a maximum difference in signal between the additivated fuel and the non-additivated fuel.

Such devices are, for example, described in WO 2009/047605, WO 2009/047607 or also WO 2009/047608.

These technologies make possible the use of a no-moving-part spectrometer of the following type: dispersive grating, Fourier transform, emitting diodes or others. They can also be miniaturized and the emission and detection systems can be connected to one another via an optical fiber. Thus, these technologies can be easily incorporated on an engine or a vehicle. They are also robust and cheap.

According to a preferred embodiment of the invention, the system for additivation of fuel and diagnosis comprises a device for distribution of the specific additive.

According to this embodiment, the additive distribution device comprises:
- a tank containing the additive,
- a chamber which is in communication with the fuel circulation circuit and inside which the tank containing the additive is inserted, at least one movable and leaktight wall between said chamber and said tank providing, on the one hand, leaktight separation and, on the other hand, maintaining an identical pressure between the additive in the tank and the fuel in the chamber,
- means for injecting the additive which are connected to the tank and to the fuel circulation circuit and which make it possible to distribute the additive in the fuel circulation circuit, said means comprising a distribution channel connecting the tank and the fuel circulation circuit.

According to one characteristic of the additive distribution device according to the invention, the additive tank is provided in the form of a flexible bag and said flexible bag constitutes the movable and leaktight wall.

According to another characteristic of the additive distribution device according to the invention, the movable and leaktight wall is composed of a membrane.

According to yet another characteristic of the additive distribution device according to the invention, the movable and leaktight wall is composed of a piston.

According to another characteristic of the additive distribution device according to the invention, the device comprises a fuel inlet orifice, a fuel outlet orifice, an additive distribution orifice and a means for generating a pressure difference between the fuel inlet orifice or fuel outlet orifice and the additive distribution orifice.

According to another characteristic of the additive distribution device according to the invention, the means for generating a pressure difference is provided in the form of a diaphragm or of a venturi.

According to another characteristic of the additive distribution device according to the invention, the means for generating a pressure difference is provided in the form of a filtering element.

According to another characteristic of the additive distribution device according to the invention, the device comprises a channel for distribution of the additive and a means for total or partial sealing of the channel for distribution of the additive.

According to another characteristic of the additive distribution device according to the invention, the means for sealing the channel for distribution of the additive is an electromechanical means.

According to another characteristic of the additive distribution device according to the invention, the additive distribution device comprises a device for filtration of the fuel comprising at least one filtering element.

According to another characteristic of the additive distribution device according to the invention, the filtering element is annular in shape and the additive tank is positioned concentrically inside said filtering element.

According to another characteristic of the additive distribution device according to the invention, the filtering element is annular in shape and the additive tank is positioned concentrically outside the filtering element.

According to another characteristic of the additive distribution device according to the invention, the filtering element and the additive tank are superimposed axially.

According to another characteristic of the additive distribution device according to the invention, the filtering element is traversed by the fuel, delimiting an upstream side, located between the fuel tank and the filtering element, where the unfiltered fuel circulates, and a downstream side, positioned between the filtering element and the combustion engine, where the filtered fuel circulates, and in that the additive is diffused from the upstream side.

According to another characteristic of the additive distribution device according to the invention, the filtering element is traversed by the fuel, delimiting an upstream side, located between the fuel tank and the filtering element, where the unfiltered fuel circulates, and a downstream side, positioned between the filtering element and the combustion engine, where the filtered fuel circulates, and in that the additive is diffused from the downstream side.

According to another characteristic of the invention, the additive is diffused into the fuel return line of the internal combustion engine, downstream of the injection system and toward the fuel tank.

According to another characteristic of the invention, the movable wall is positioned between the additive tank and the upstream side.

According to another characteristic of the invention, the movable wall is positioned between the additive tank and the downstream side.

The invention also relates to an additivation and diagnosis system in which the device for distribution of a liquid additive comprises a liquid additive tank which makes it possible to diffuse an additive into the fuel circulation circuit by means of a distribution channel, an additive chamber in communication with the fuel circulation circuit and at least one movable and leaktight wall between said additive chamber and the additive tank providing, on the one hand, leaktight separation and, on the other hand, maintaining an identical pressure between the additive in the additive tank and the fuel in the additive chamber and at least one filtering element, the distribution device being characterized in that it comprises, on the one hand, a diffusion head intended to be permanently fitted to the fuel circulation circuit and comprising a channel for distribution of the additive into the fuel circulation circuit and, on the other hand, a cartridge comprising the filtering element, the additive tank and the movable and leaktight wall, said cartridge being fitted in removable fashion to the diffusion head.

One advantage of the distribution device of the present invention lies in the fact that it is possible to incorporate an additive diffuser both during the design of new engines and in pre-existing engines.

Another advantage of the invention lies in the possibility of being able to precisely diffuse a defined amount of additive.

Another advantage of the invention lies in the possibility of being able to diffuse multiple types of additive, whatever their composition and/or whatever their physicochemical properties.

Another advantage of the invention lies in the compactness of the additive distribution device.

The fuel additivation and diagnosis system and in particular that corresponding to the abovementioned preferred embodiment will now be described in more detail with reference to the appended figures.

Figure 1:
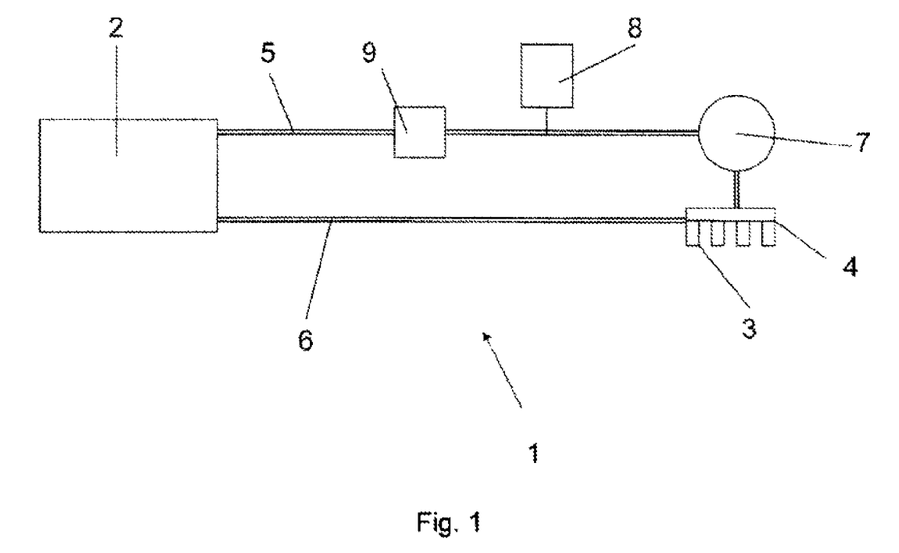
FIG. 1 is a diagrammatic representation of a device for distribution of an additive in a fuel circulation circuit for an internal combustion engine according to the invention.

FIG. 1 diagrammatically represents a fuel circulation circuit 1 for an internal combustion engine. Conventionally, the fuel circulation circuit 1 is positioned between a fuel tank 2 and the high-pressure perforated distribution pipe 4 (also known as common rail) and provides the circulation of the fuel between the tank and the high-pressure perforated distribution pipe. The supply circuit comprises a filter 9 intended to filter the fuel and a high-pressure pump 7. The high-pressure pump 7 and the high-pressure perforated distribution pipe 4 constitute the system for injection of the fuel. A first pipe 5, known as "supply line", provides the circulation of fuel from the tank 2 toward the high-pressure perforated distribution pipe 4 and a second pipe 6, known as "return line", provides the circulation of fuel from the injection system toward the tank 2. The fuel is thus pumped into the tank 2, then filtered in the filter 9 is sent under pressure, via the pump 7, into the high-pressure perforated distribution pipe 4 and then a portion is directed toward the injectors 3 of the engine and another portion returned to the tank 2 by the return line 6. A portion of the fuel can also be sent from the high-pressure pump 7 toward the return line 6. The fuel circulation circuit 1 also comprises a device 8 for distribution of a liquid additive according to the invention, the operation of which will be described subsequently. By way of illustration and without implied limitation, the device 8 for distribution of an additive has been represented on the supply line 5 but, as will be described subsequently, said device 8 for distribution of an additive can also be positioned on the fuel return line 6.

Figure 2:
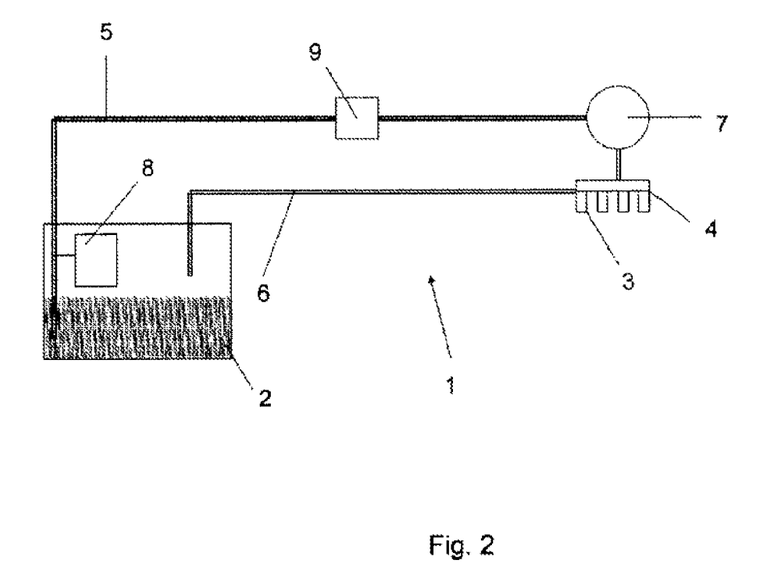
FIG. 2 is a diagrammatic representation identical to that of FIG. 1, the additive distribution device being positioned in a fuel tank.

In an alternative form, as represented in FIG. 2, the device 8 for distribution of an additive can also be positioned in the fuel tank 2.

In this embodiment, the fuel circulation circuit 1 provides the circulation of the fuel between the inside of the fuel tank 2 and the engine, and optionally the return of the fuel toward the tank 2. Thus, the portion of the fuel circulation circuit 1 supporting the distribution device 8 extends inside the fuel tank 2.

Figure 3:
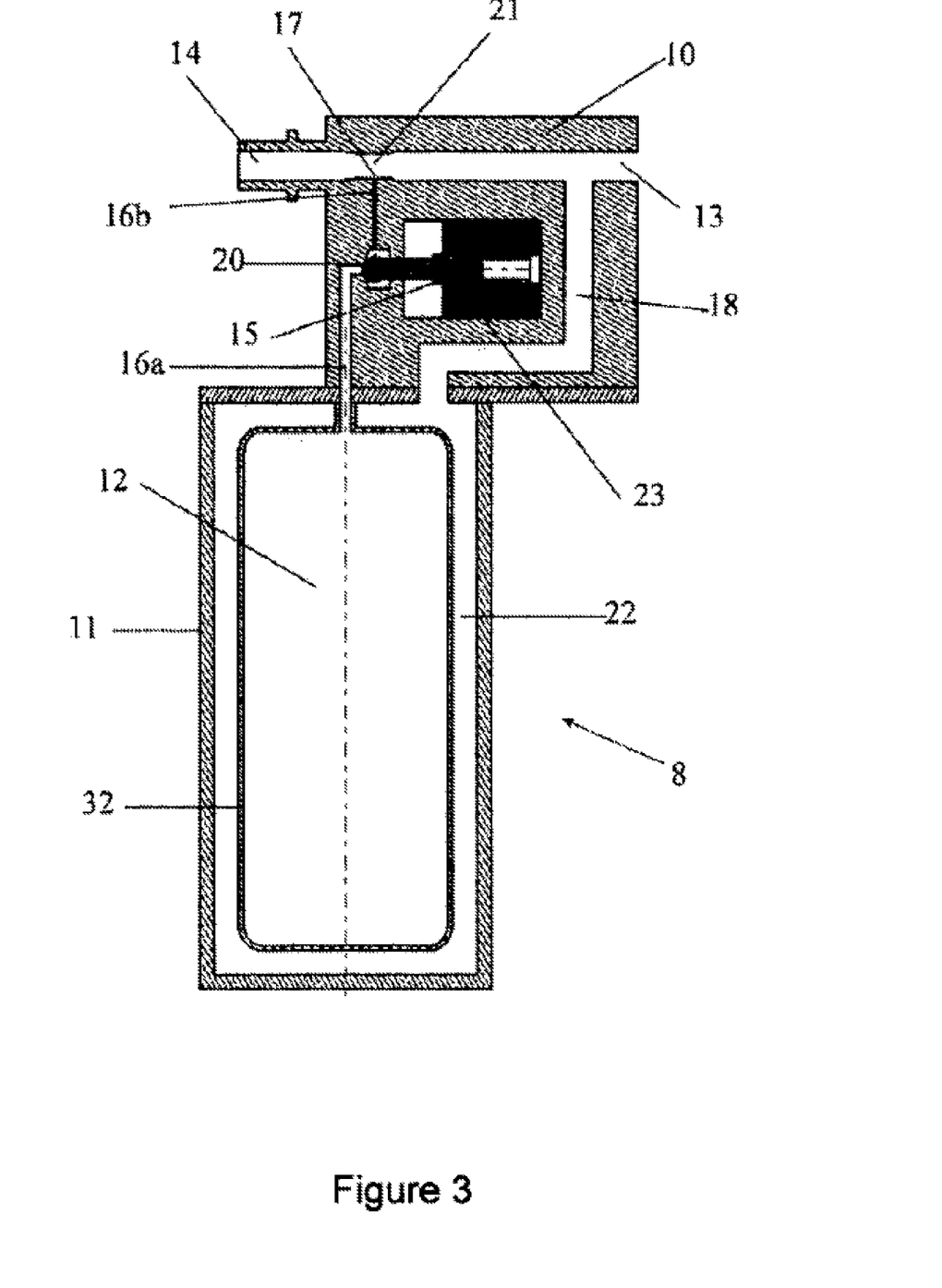
FIG. 3 is a cross-sectional view illustrating an additive distributor according to a first embodiment of the invention.

FIG. 3 represents, in cross-sectional view, a first embodiment of the additive distribution device. In this implementational example, the device 8 for distribution of an additive comprises a head 10 and a replaceable cartridge 11 forming an additive chamber 22 in which a liquid additive tank 12 is positioned. The head 10 comprises a fuel inlet orifice 13, an outlet orifice 14 for the fuel, a venturi 21 located between the inlet and outlet orifices for the fuel, a pipe 18 providing passage of fuel between the inlet orifice for the fuel and the additive chamber 22 inside the replaceable cartridge 11 and an additive distribution channel 16 providing passage of the liquid additive from the tank 12 toward an orifice 17 for diffusion of additive into the venturi 21. In this implementational example, the additive distribution channel 16 exhibits a first portion 16a and a second portion 16b of reduced cross-section. An actuator 15 composed of a finger 20 and of a coil 23 makes it possible to seal the passage between the portions 16a and 16b of the additive distribution channel. In this implementational example (and also in FIGS. 4 to 8), the additive tank 12 is provided in the form of a flexible bag 32 constituting a movable and leaktight wall between the fuel present in the additive chamber 22 and the additive inside the tank 12.

The invention operates in the following way:

The device 8 for distribution of an additive is connected to the fuel supply line or to the fuel return line. The fuel thus circulates continuously between the inlet and outlet orifices 13 and 14 for the fuel.

The venturi 21, which constitutes a known means for generating a pressure difference, generates a low pressure between the additive distribution orifice 17 and the fuel inlet orifice 13.

The additive chamber 22, which is in communication, via the pipe 18, with the fuel inlet orifice 13, is filled with fuel at the same pressure as the fuel circulating at the fuel inlet orifice 13; the flexible bag 32 constituting the movable and leaktight wall of the additive tank maintains an identical pressure between the additive in the additive tank 12 and the fuel in the chamber 22.

The pressure in the additive tank 12 is thus greater than the pressure prevailing at the additive diffusion orifice 17, which forces the additive to move from the tank 12 toward the additive diffusion orifice 17 and then to diffuse into the fuel circulating in the venturi 21 and thus into the fuel circulation circuit. The actuator 15 makes it possible to completely or partially prevent the circulation of the additive.

In this implementational example, the actuator 15 illustrates an electromechanical means for complete or partial sealing of the channel for distribution of the additive. However, the use of such a means is optional and the invention can obviously be implemented without sealing the additive distribution channel or using other means for sealing the additive distribution channel, for example a thermal valve, an "umbrella" valve, a nonreturn valve or a hydraulically controlled valve.

FIGS. 4 to 11 illustrate an additive distribution device according to the invention comprising at least one filtering element.

Figure 4:
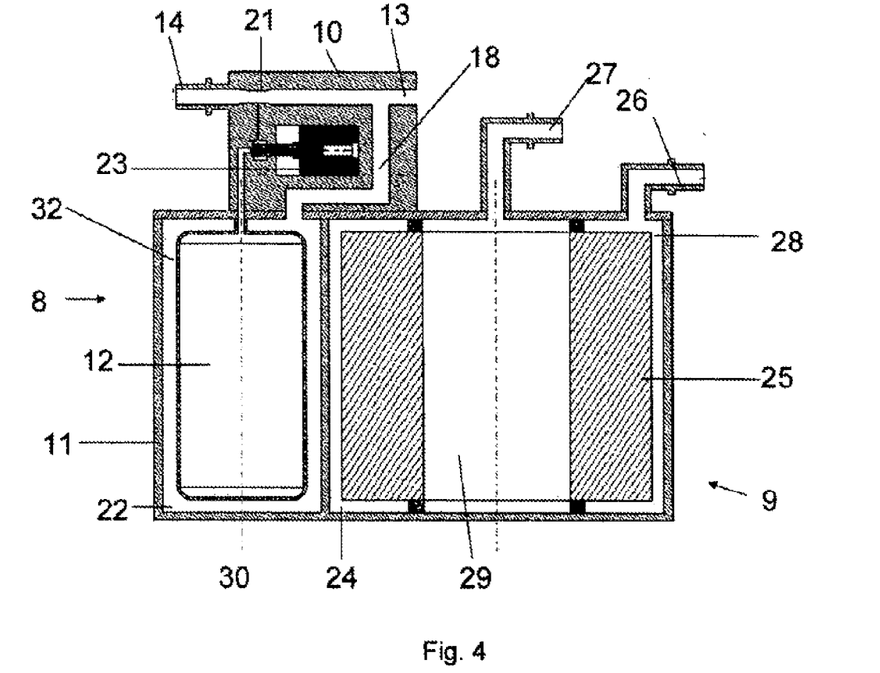
FIGS. 4 to 11 are cross-sectional views illustrating other embodiments of the invention consisting in incorporating the additive distributor in a fuel filter.

FIG. 4 illustrates a first alternative embodiment of the invention. In this alternative embodiment, the head 10 is identical to that represented in FIG. 3 and the additive tank 12 is also formed by a flexible bag 32. The cartridge 11 comprises a leaktight wall 30 delimiting, in interaction with the walls of the cartridge, on the one hand, the additive chamber 22 in which the liquid additive tank 12 is positioned and, on the other hand, a filtration chamber 24 in which a filtering element 25 is positioned. Thus, the additive tank 12 and the filtering element 25 are positioned side-by-side but separated by the leaktight wall 30. The filtering element 25 is of annular shape and is traversed by the fuel. The filtering element 25 delimits, in the filtration chamber 24, on the one hand, an area of unfiltered fuel, or "upstream side 28", located between the fuel tank 2 (not represented in this figure) and the filtering element 25, where the unfiltered fuel circulates, and an area of filtered fuel, or "downstream side 29", positioned between the filtering element 25 and the combustion engine (not represented in this figure), where the filtered fuel circulates. Such an embodiment advantageously makes it possible to independently provide the functions of filtration of the fuel and of distribution of the liquid additive. Thus, the fuel filter is connected to the supply line 5, whereas the additive distribution can be carried out both at the supply line 5 and at the return line 6.

Figure 5:
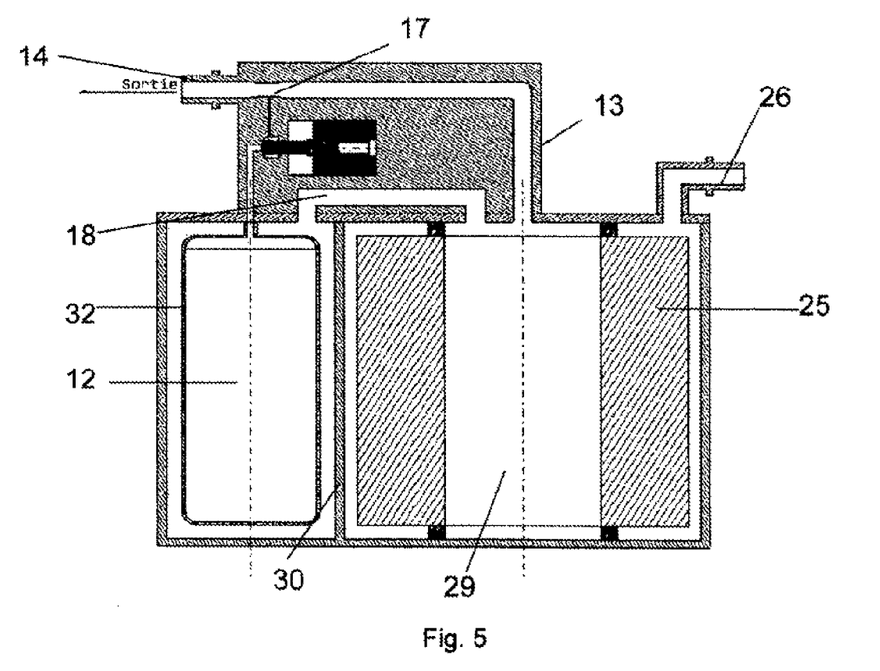

FIG. 5 illustrates a second alternative embodiment of the invention. In this alternative embodiment, the additive tank 12 and the filtering element 25 are positioned side-by-side, separated by the wall 30, but the communication channel 18 makes it possible for the fuel to circulate directly between the downstream side 29 of the filtration element and the additive chamber 22 in which the liquid additive tank 12 is positioned. The fuel inlet orifice 13 of the head 10 is directly connected to the downstream side 29 of the filtration element. The additive diffusion orifice 17 is positioned at the fuel supply line, between the downstream side 29 of the filtering element and the internal combustion engine (not represented). Thus, the movable wall 32 is positioned between the additive tank 12 and the downstream side 29 of the filtering element and the additive is diffused on the downstream side 29 of the filtration element.

Figure 6:
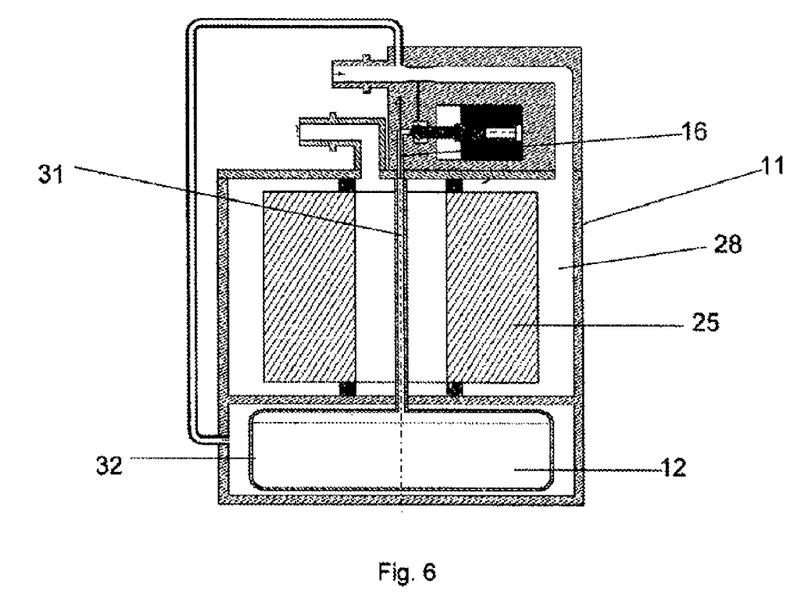

FIG. 6 illustrates another alternative embodiment of the invention. In this alternative embodiment, the additive tank 12 and the filtering element 25 are superimposed axially in the cartridge 11; a communication channel makes it possible for the fuel to circulate between the upstream side of the filtration element and the additive chamber 22 in which a liquid additive tank 12 is positioned. The additive tank 12 is connected to the additive distribution channel 16 by means of a conduit 31, the upper end of which interacts with the lower end of the first portion 16a of the additive distribution channel 16. The conduit 31 is here coaxial with the annular filtering element 25 and passes through it at its center in a leaktight manner. In this implementational example, the conduit 31 is integral with the additive tank 12. The additive diffusion orifice 17 is positioned at the fuel supply line, between the upstream side 28 of the filtering element and the fuel tank 2 (not represented). Thus, the movable wall 32 is positioned between the additive tank 12 and the upstream side 28 of the filtering element and the additive is diffused on the upstream side 28 of the filtering element.

Figure 7:
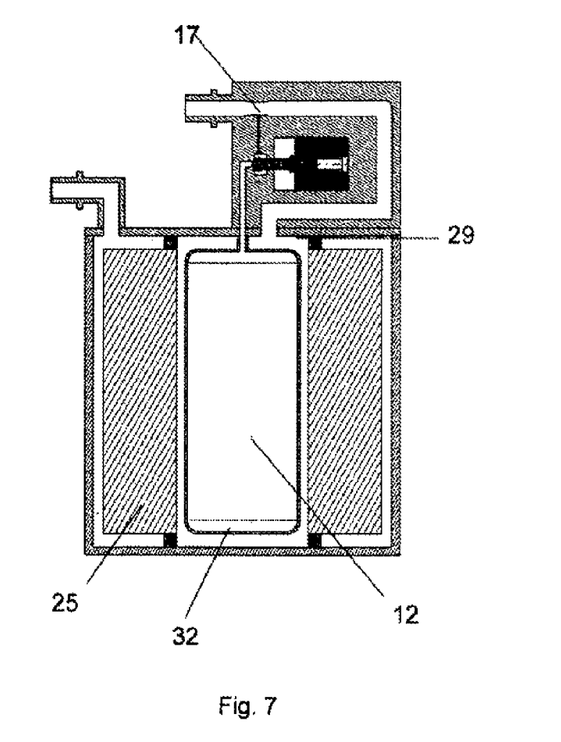

FIG. 7 illustrates yet another alternative embodiment of the invention. In this alternative embodiment, the filtering element 25 is annular in shape and the additive tank 12 is positioned concentrically inside said filtering element 25. The fuel circulates, in this example, radially from the outside toward the inside of the filtering element 25 and the additive diffusion orifice 17 is positioned at the fuel supply line, between the downstream side 29 of the filtering element and the internal combustion engine (not represented). Thus, the movable wall 32 is positioned between the additive tank 12 and the downstream side 29 of the filtering element and the additive is diffused on the downstream side 29 of the filtration element.

Figure 8:
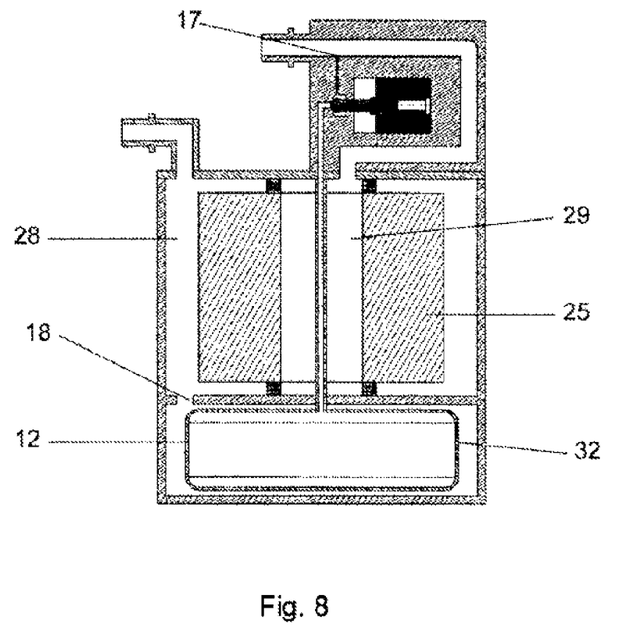

FIG. 8 illustrates another alternative embodiment of the invention. In this alternative embodiment, the additive tank 12 and the filtering element 25 are superimposed axially, separated by a wall, but a communication channel 18 makes it possible for the fuel to circulate between the upstream side 28 of the filtering element 25 and the additive chamber 22 in which the liquid additive tank 12 is positioned. The additive diffusion orifice 17 is positioned at the fuel supply line, between the downstream side 29 of the filtering element and the internal combustion engine (not represented). Thus, the movable wall 32 is positioned between the additive tank 12 and the upstream side 28 of the filtering element 25 and the additive is diffused on the downstream side 29 of the filtering element. In this embodiment, the means for generating a pressure difference is formed by the filtering element 25.

Figure 9:
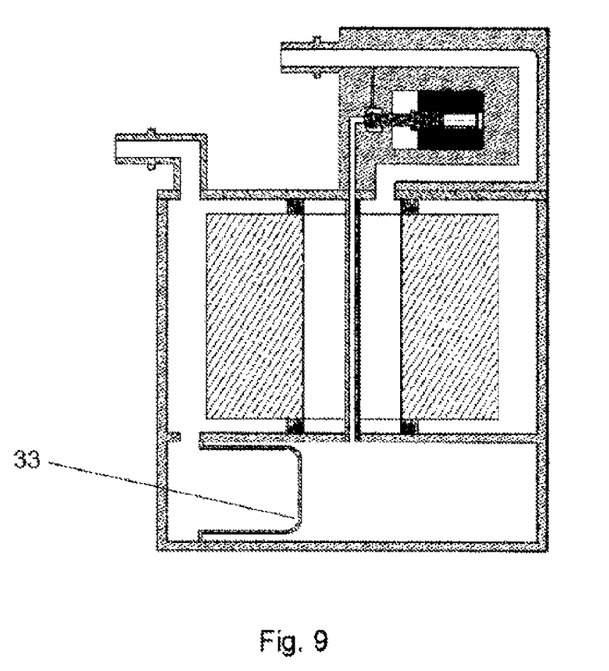

FIG. 9 is an alternative form of the device illustrated by FIG. 8 in which the movable and leaktight wall is formed by a membrane 33.

Figure 10:
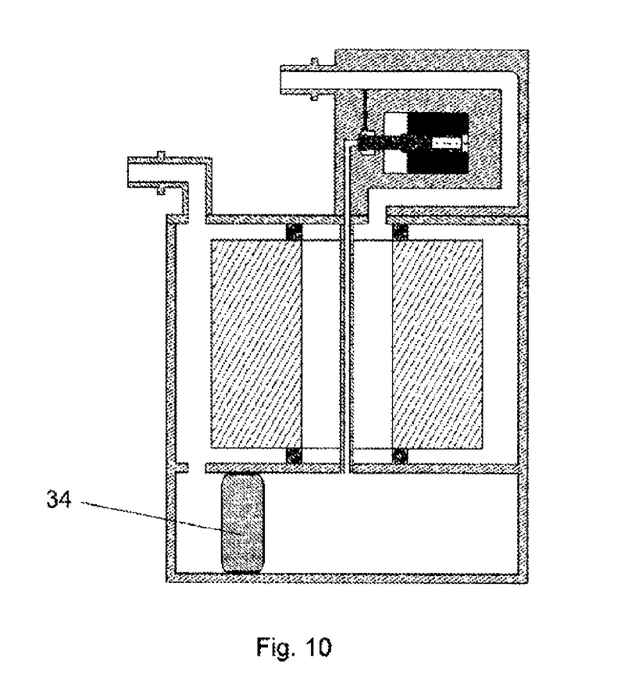

FIG. 10 is an alternative form of the device illustrated by FIG. 8 in which the movable and leaktight wall is formed by a piston 34.

These embodiments have been mentioned by way of illustration and are under no circumstances limiting. The invention will be able to be carried out under other alternative forms. For example, the means for generating a pressure difference will be able to be provided in the form of a diaphragm or the additive tank will be able to be positioned concentrically outside the filtering element.

Figure 11:
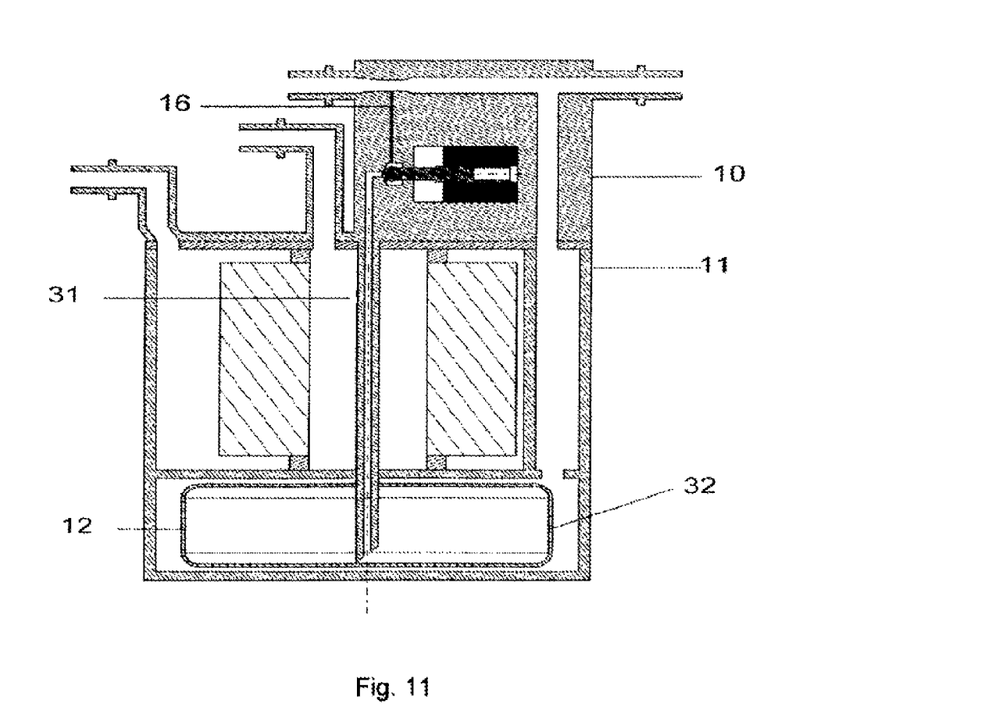

FIG. 11 illustrates yet another alternative embodiment of the invention. In this alternative embodiment, the additive is diffused into the fuel return line 6 of the internal combustion engine, downstream of the injection system and toward the fuel tank 2 (not represented in the figure). The device for distribution of a liquid additive thus illustrated comprises, on the one hand, a diffusion head 10 intended to be permanently fitted to the fuel circulation circuit and comprising a channel 16 for distribution of the additive into the fuel circuit and, on the other hand, a cartridge 11 comprising a filtering element 25, an additive tank 12 and a movable and leaktight wall 32, said cartridge 11 being fitted in removable fashion to the diffusion head 10. In this implementational example, the conduit 31, which makes possible the circulation of the additive from the additive tank 12 toward the distribution channel 16, is integral with the head 10 and comprises a bevelled end in order to pierce the flexible bag 32 when the cartridge 11 is rendered integral with the head 10.

The implementational examples illustrated by the figures are given by way of indication and are in no way limiting. A person skilled in the art will understand that the invention also relates to embodiments not represented here but resulting from the combination of several embodiments described above or from the replacement of one or more characteristics of one figure by the characteristics of another figure.

The different additives which can be used by the distribution device according to the invention will from this point be more particularly described, these additives being well-known in the technical field concerned here.

These additives can be classified into two categories: on the one hand, those which have a catalytic function of helping in the regeneration of the particle filters and, on the other hand, those which have a function other than a catalytic function, such as additives for improving the distribution of the fuel in the engine, additives for improving the performance of the operation of the engine or additives for improving the stability of the operation of the engine.

The additives used are generally provided in the liquid form and can be composed of a liquid or of a mixture of liquids, of a colloidal suspension in a liquid base, or in the gel form, the viscosity of which gel makes it possible for the additive to flow.

However, it is also possible to use solid additives which will gradually dissolve or deagglomerate in order to release the necessary amount of additive into the fuel.

The Additives for Helping in the Regeneration

These additives are ideally liquids in the operating temperature range, of generally between 20 and 45° C., but they can also be in another physical form, such as a gel or also a solid.

These additives can comprise any type of catalyst effective in catalyzing the combustion of soot, in particular platinum, strontium, sodium, manganese, cerium, iron and/or their combination.

The amount of additive necessary in the fuel is generally at least approximately 1 ppm and at most approximately 100 ppm, this amount being expressed by weight of metal additive element, with respect to the weight of fuel.

These additives can be provided in the form of an organometallic salt or of a mixture of organometallic salts soluble or dispersible in the fuel. These salts are characterized in that they comprise at least a metallic part and a complexing organic part generally of acid origin, the combination being in suspension in a solvent.

The FBC additives can also be provided in the form of an organometallic complex or of a mixture of organometallic complexes soluble or dispersible in the fuel. These complexes are characterized in that they comprise at least a metal part and at least two complexing organic parts. Such a product is, for example, described in GB 2 254 610.

Equally, the FBC additives can also be provided in the form of a colloidal dispersion or suspension of nanoparticles, for example of amorphous or crystalline metal oxide or oxyhydroxide.

The expression "colloidal dispersion" denotes, in the present description, any system composed of fine solid particles of colloidal dimensions based on the additive, in suspension in a liquid phase, it being possible for said particles in addition to optionally comprise residual amounts of bonded or adsorbed ions, such as, for example, nitrates, acetates, citrates, ammoniums or chlorides. The term "colloidal dimensions" is understood to mean dimensions of between approximately 1 nm and approximately 500 nm. These particles can more particularly exhibit a mean size of at most 100 nm and more particularly still of at most 20 nm.

In the case of the FBC additives in the colloidal dispersion form, the particles can be based on a rare earth metal and/or on a metal chosen from Groups IIA, IVA, VITA, VIII, IB, IIB, IIIB and IVB of the Periodic Table.

The term "rare earth metal" is understood to mean the elements of the group consisting of yttrium and the elements of the Periodic Table with an atomic number of between 57 and 71 inclusive.

The Periodic Table of the Elements to which reference is made is that published in the Supplement to the Bulletin de la Société Chimique de France, No. 1 (January 1966).

For these additives capable of being used in the form of a colloidal dispersion, the rare earth metal can more particularly be chosen from cerium, lanthanum, yttrium, neodymium, gadolinium and praseodymium. Cerium can very particularly be chosen. The metal can be chosen from zirconium, iron, copper, gallium, palladium and manganese. Iron can very particularly be chosen. The iron can be in the form of an amorphous or crystalline compound.

Mention may also more particularly be made of the colloidal dispersions based on a combination of cerium and iron.

The colloidal dispersions can more particularly comprise:
an organic phase,
particles of the additive, of the type described above (in particular rare earth metal and/or a metal chosen from Groups IIA, IVA, VITA, VIII, IB, IIB, IIIB and IVB), in suspension in the organic phase,
at least one amphiphilic agent.

These colloidal dispersions can in particular comprise an additive based on iron or on an iron compound.

The colloidal dispersions can be provided according to different embodiments described in particular in the following patent applications: EP 671 205, WO 97/19022, WO 01/10545, WO 03/053560, WO 2008/116550.

The Other Additives

Other types of known additives, different from the FBCs and which have a function other than a catalytic function, can also be injected into the circulation circuit. These additives make it possible to improve the distribution of the fuel in the engine and/or to improve the performance of the operation of the engine and/or also to improve the stability of the operation of the engine.

The additives for improving the distribution of fuel in the engine include, for example, foam inhibitors, such as organosilicones, and defrosting additives, such as alcohols having low molecular weights or glycols.

Other additives are those which improve the operation of the engine under cold conditions. Mention may be made of polymeric additives which reduce the temperature at which the fuel turns cloudy or sets solid, additives which promote flow, such as polymers having high molecular weights, which reduce the turbulence in the fluids and can increase the flow rate by 20% to 40%.

Corrosion inhibitors can also be used.

Additives for improving the operating performance of the engines can also be used, such as cetane number improvers, octane number improvers, smoke inhibitors, additives which reduce losses by friction, known as FM (Friction Modifier) additives, or "extreme pressure" additives.

Detergent additives, intended to limit any deposit at the injectors, can also be used. This is because the fuel can form deposits in the fuel circuit, in particular at the high-pressure fuel injectors and very particularly at the holes of the injectors. The extent of the formation of the deposit varies with the design of the engine, in particular the characteristics of the injectors, the composition of the fuel and the composition of the oil used to lubricate the engine. Furthermore, these detergents are also effective in reducing the negative impact of the presence of metal compounds in the fuel, such as Zn or Cu, which can originate from a contamination, for example of the system for distribution of the fuel, or also be traces of compounds originating from the process for the synthesis of the fatty acid esters.

Excessive deposits can modify the aerodynamics, for example of the jet of fuel resulting from the injector, which in its turn can impede the air/fuel mixture. In some cases, this results in excessive fuel consumption, loss in power of the engine and enhanced emissions of pollutants.

The detergent additives exhibit the distinguishing feature of dissolving the deposits already formed and of reducing the formation of the deposit precursors, in order to prevent the formation of new deposits. An example of detergent additive is, for example, described in WO 2010/150040.

Additives for improving the lubricating power can also be used to prevent wear or seizing of the high-pressure pumps, in particular, and of the injectors, the lubricating power of the fuels being itself mediocre. They comprise a polar group which is attracted by the metal surfaces in order to form a protective film at the surface.

Additives for improving the operating stability of the engines can be envisaged. This is because the instability of the fuels results in the formation of gums, which participate in the fouling of the injectors, in the blocking of the fuel filter and in the fouling of the pumps and of the injection system.

The following additives can also be used:
additives of antioxidant type;
stabilizers;
metal deactivators targeted at neutralizing the catalytic effects of certain metals;
dispersants targeted at dispersing the particles formed and preventing the agglomeration of quite large particles.

According to a specific embodiment, the additive is a combination of a detergent additive and of a lubricating additive and optionally of a corrosion inhibitor.

In the case of a vehicle equipped with a PF, it will be advantageous to combine, with an additive of FBC type, at least one fuel performance additive of detergent type as described in the patent application WO 2010/150040.

In the case of a vehicle equipped with a PF, it will also be advantageous to combine, with an additive of FBC type, several fuel performance additives, in particular when the vehicle is sold in a geographical area where the fuel is of variable and/or mediocre quality.

In the case of a vehicle not equipped with a PF, different types of combinations of additives can be envisaged, such as that combining one or more detergents with a lubricating additive and with a corrosion inhibitor.

Examples will now be given.

EXAMPLE 1

This example describes the employment of the device using visible spectroscopy at a fixed wavenumber (500 nm) to detect the presence of additive of FBC type in a diesel fuel. The FBC additive used in this example is composed of a colloidal suspension of iron-based particles, such as dispersion C of example 3 of the patent application WO 2010/150040. This catalytic colloidal suspension is typically used in a concentration range which makes it possible to additivate the fuel with an iron concentration of 7 ppm weight of iron (metal) in the fuel in order to regenerate PFs of specific vehicles, such as those equipped with a Euro 5 engine having a cylinder capacity of 2 l.

In this example, 4 different fuels were tested:
a commercial diesel fuel corresponding to the European standard EN590;
a diesel biofuel B10 comprising 90% of EN590 diesel fuel and 10% of biodiesel based on fatty acid methyl ester (FAME) corresponding to the standard EN14214;
a diesel biofuel B30 comprising 70% of EN590 diesel fuel and 30% of biodiesel based on fatty acid methyl ester (FAME) corresponding to the standard EN14214;
a kerosene fraction fuel corresponding to the NATO RF63 fuel from the oil company Total.

These fuels were additivated with a precise amount of FBC additive, so as to result in an FBC content in the fuel corresponding to 5, 6 or 10 ppm weight.

Each fuel, before and after additivation, is analyzed by the spectrometer at a wavelength of 500 nm and the absorbance of the light by the fuel is recorded. These absorbancies are given in table 1 below.

It is found that the additive-free fuels have absorbencies A1 which can vary between 0.042 and 0.141. In each of the cases, the addition of FBC additive, even in a very small amount, results in an increase in the absorbance (A2, A3 or A4), an increase which becomes greater in proportion as the amount of FBC added becomes greater. This shows that a comparison of the absorbance of the fuel at 500 nm before and after additivation indeed makes it possible to detect whether there has (increase) or has not (no increase) been additivation.

The table also shows that the difference in absorbance between the additivated fuel and the non-additivated fuel is, for a fixed content of additive, identical whatever the fuel: typically 0.015-0.016 for 5 ppm of iron and 0.031-0.035 for 10 ppm of iron, 6 ppm of iron resulting in an intermediate relative absorbance (0.023). The difference is proportional to the content of additive in the fuel. Thus, it is clearly possible to detect an excess (or deficiency) of additivation by the value of the difference in absorbance. This shows that this device makes it possible to detect a drift of the system.

TABLE 1

| | Commercial diesel EN590 | Diesel B10 | Diesel B30 | NATO RF63 fuel |
|---|---|---|---|---|
| A1 = Absorbance non-additivated fuel | 0.141 | 0.071 | 0.066 | 0.042 |
| A2 = Absorbance fuel comprising 5 ppm iron | 0.156 | 0.087 | — | 0.057 |
| A3 = Absorbance fuel comprising 6 ppm iron | — | — | 0.089 | — |
| A4 = Absorbance fuel comprising 10 ppm iron | 0.176 | 0.104 | — | 0.073 |
| A2-A1 = Absorbance due to 5 ppm iron | 0.015 | 0.016 | — | 0.015 |
| A3-A1 = Absorbance due to 6 ppm iron | — | — | 0.023 | — |
| A4-A1 = Absorbance due to 10 ppm iron | 0.035 | 0.033 | — | 0.031 |

EXAMPLE 2

This example illustrates the employment of the device using visible spectroscopy at a fixed wavenumber (500 nm) in combination with a device, as described in FIG. 3, for distribution of a liquid additive identical to that of example 1, the spectrometer carrying out the measurement in the fuel tank and the distribution device injecting the additive into the return line of the fuel circuit.

The injection device exhibits an inlet cross-section of the fuel line 13 of 6 mm and comprises a venturi 21 with a diameter of 5.06 mm, which subjects the additive to a difference in pressure of 16 mbar, with respect to the pressure of the fuel, for a circulation flow rate of the fuel of 160 l/h. The additive is distributed into the fuel by means of an additive distribution channel 16b with a length of 21 mm and a diameter of 0.6 mm.

The injection device is regulated in order to inject an amount of additive, after each addition of fuel to the tank, so as to achieve an unvarying concentration of 4 ppm of iron in the fuel.

An analysis of the fuel (commercial diesel corresponding to the standard EN590) is carried out, before the beginning of each injection of additive and after the end of each injection of additive, by the visible spectrometer installed in the vehicle.

In order to simulate a malfunctioning in the vehicle, the device for injection of the additive was disconnected from the fuel circuit before the fourth filling of the fuel tank of the vehicle.

TABLE 2

|  | A1: Absorbance fuel after the addition of fuel and before the injection of additive | A2: Absorbance fuel after the injection of additive subsequent to the addition of fuel | A2-A1: |
|---|---|---|---|
| First injection of additive | 0.143 | 0.149 | 0.007 |
| Second injection of additive | 0.142 | 0.148 | 0.008 |
| Third injection of additive | 0.143 | 0.150 | 0.009 |
| Fourth injection of additive | 0.143 | 0.142 | −0.001 |

It is found (table 2) that, during the first 3 injections, the absorbance signal increases during the addition of the additive (A2>A1). The difference in absorbance subsequent to the addition of additive is very similar over the first 3 additions (A2-A1).

On the other hand, when the device for injection of the additive was bypassed for the fourth injection, it is found that the absorbance of the fuel after theoretical additivation has not increased, the difference in absorbance A2-A1 being virtually zero, which demonstrates the ability of the system to detect a malfunctioning of the additive injection system.

The invention claimed is:

1. A fuel additivation and diagnosis system for a vehicle having an internal combustion engine, wherein the system comprises:
   an additive distribution device for distributing at least one additive in a fuel circulation circuit of the engine of the vehicle, wherein the additive distribution device comprises:
      a tank (12) containing an additive,
      a chamber (22) which is in communication with a fuel circulation circuit (1) and inside which the tank (12) is inserted,
      at least one movable and leaktight wall (32, 33, 34) between said chamber (22) and said tank (12) providing leaktight separation and maintaining an identical pressure between the additive in the tank (12) and fuel in the chamber (22), and
      means for injecting the additive which are connected to the tank (12) and to the fuel circulation circuit (1) adapted to distribute the additive in the fuel circulation circuit (1), said means comprising a distribution channel (16, 16a, 16b) connecting the tank (22) and the fuel circulation circuit (1);
   an analytical device for analysis of the fuel, wherein the analytical device measures data, said data comprising the content of the at least one additive in the fuel;
   means for sending the data from said analytical device to a component of the vehicle.

2. A method for diagnosing the malfunctioning of the additive distribution device in the fuel additivation and diagnosis system of claim 1, wherein the method comprises the following stages:
   (a) measuring a variation in content of additive in the fuel with the analytical device;
   (b) comparing the measured variation in the content of additive and a theoretical variation in this content to determine a difference between the measured variation and the theoretical variation; and
   (c) sending the data to the component of the vehicle when the difference between the measured variation and the theoretical variation in this content of additive exceeds a fixed value.

3. The method as claimed in claim 2, wherein the data in stage (c) is sent to at least one of the following components:
   the additive distribution device;
   an electronic central processing unit of the vehicle;
   a central system for diagnosing failure of the vehicle.

4. The system as claimed in claim 1, wherein the analytical device is a spectrometry device.

5. The system as claimed in claim 1, wherein the additive tank (12) is provided in the form of a flexible bag (32) and in that said flexible bag (32) constitutes the movable and leaktight wall.

6. The system as claimed in claim 1, wherein the movable and leaktight wall comprises a membrane (33) or a piston (34).

7. The system as claimed in claim 1, wherein the additive distribution device comprises a fuel inlet orifice (13), a fuel outlet orifice (14), an additive distribution orifice (17) and a means (21, 25) for generating a pressure difference between the fuel inlet orifice (13) or fuel outlet orifice (14) and the additive distribution orifice (17).

8. The system as claimed in claim 7, wherein the means for generating a pressure difference is provided in the form of a diaphragm or a venturi (21).

9. The system as claimed in claim 7, wherein the means for generating a pressure difference is provided in the form of a filtering element (25).

10. The system as claimed in claim 1, wherein the system further comprises a means (15) for total or partial sealing of the channel (16, 16a, 16b) for distribution of the additive.

11. The system as claimed in claim 10, wherein the means (15) for sealing the channel for distribution of the additive is an electromechanical means.

12. The system as claimed in claim 1, wherein the additive distribution device comprises a device for filtration of the fuel comprising at least one filtering element (25).

13. The system as claimed in claim 12, wherein the filtering element (25) is annular in shape and the additive tank (12) is positioned concentrically inside said filtering element (25).

14. The system as claimed in claim 12, wherein the filtering element (25) is annular in shape and the additive tank (12) is positioned concentrically outside the filtering element (25).

15. The system as claimed in claim 12, wherein the filtering element (25) and the additive tank (12) are superimposed axially.

16. The system as claimed in claim 12, wherein the filtering element (25) is traversed by the fuel, delimiting an upstream side (28), located between the fuel tank (2) and the filtering element (25), where the unfiltered fuel circulates, and a downstream side (29), positioned between the filtering element (25) and an internal combustion engine, where the filtered fuel circulates, and wherein the additive is diffused from the upstream side (28) or from the downstream side (29).

17. The system as claimed in claim 12, wherein the movable wall (32, 33, 34) is positioned between the additive tank (12) and the upstream side (28).

18. The system as claimed in claim 12, wherein the movable wall (32, 33, 34) is positioned between the additive tank (12) and the downstream side (29).

19. The system as claimed in claim 12, wherein the additive distribution device comprises (a) a diffusion head (10) intended to be permanently fitted to the fuel circulation circuit (1) and comprising a channel (17) for distribution of the additive into the fuel circulation circuit (1) and (b) a cartridge (11) comprising the filtering element (25), the additive tank (12) and the movable and leaktight wall (32), said cartridge (11) being fitted in removable fashion to the diffusion head (10).

20. The system as claimed in claim 1, wherein the additive distribution device is located so that the additive is diffused into a fuel return line (6) of an internal combustion engine, downstream of an injection system and toward a fuel tank (2).

21. The system as claimed in claim 1, wherein the component of the vehicle is selected from:
the additive distribution device;
an electronic central processing unit of the vehicle; and
a central system for diagnosing failure of the vehicle.

* * * * *